(12) United States Patent
Kim et al.

(10) Patent No.: US 12,255,748 B2
(45) Date of Patent: Mar. 18, 2025

(54) METHOD AND APPARATUS FOR PROCESSING ABUSING MESSAGE IN ANONYMOUS CHATROOM

(71) Applicant: KAKAO CORP., Jeju-si (KR)

(72) Inventors: Soo Bum Kim, Seongnam-si (KR);
Jung Woo Choi, Seongnam-si (KR);
Min Jeong Kim, Seongnam-si (KR);
Keun Seop Lee, Seongnam-si (KR);
Chang Yong Lee, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 49 days.

(21) Appl. No.: 18/091,379

(22) Filed: Dec. 30, 2022

(65) Prior Publication Data

US 2023/0216698 A1 Jul. 6, 2023

(30) Foreign Application Priority Data

Dec. 31, 2021 (KR) .................. 10-2021-0194299

(51) Int. Cl.
*H04L 12/18* (2006.01)
*H04L 9/40* (2022.01)
*H04L 51/212* (2022.01)

(52) U.S. Cl.
CPC ........ *H04L 12/1822* (2013.01); *H04L 51/212* (2022.05); *H04L 63/0421* (2013.01)

(58) Field of Classification Search
CPC ............ H04L 12/1822; H04L 51/212; H04L 63/0421; G06F 40/30; G06F 40/279; G06Q 50/40
See application file for complete search history.

(56) References Cited

U.S. PATENT DOCUMENTS

| 11,272,023 | B1 | 3/2022 | Everitt, Jr. |
| 2015/0371518 | A1* | 12/2015 | Mittal ................. G08B 21/182 340/539.11 |

(Continued)

FOREIGN PATENT DOCUMENTS

| KR | 20040110087 A | 12/2004 |
| KR | 20100080063 A | 7/2010 |

(Continued)

OTHER PUBLICATIONS

Korean Office Action for KR Application No. 10-2021-0194299 mailed on Oct. 17, 2023, citing the above reference(s).

*Primary Examiner* — Tonia L Dollinger
*Assistant Examiner* — Joseph M Cousins
(74) *Attorney, Agent, or Firm* — Seed IP Law Group LLP (57) ABSTRACT

A method for processing an abusing message in an anonymous chatroom includes providing a rule set of a latest version to an administrator terminal of the anonymous chatroom when the administrator terminal logs in to an account through a message application or enters the anonymous chatroom, receiving a new message in the anonymous chatroom, providing the new message to the administrator terminal, receiving a request for hiding the new message from the administrator terminal when the new message is determined to be an abusing message based on at least one of a spam keyword and the rule set stored in the administrator terminal, and transmitting a command to hide the new message to a user terminal that joins the anonymous chatroom according to the request for hiding the new message.

20 Claims, 6 Drawing Sheets

(56) References Cited

U.S. PATENT DOCUMENTS

2017/0041263 A1\* 2/2017 Shekel .................... H04L 51/04
2019/0342406 A1\* 11/2019 Borden .................. H04L 43/00
2020/0142999 A1 5/2020 Pedersen

FOREIGN PATENT DOCUMENTS

| KR | 20140127036 A | 11/2014 | |
|---|---|---|---|
| KR | 20150105024 A | 9/2015 | |
| KR | 20170006813 A | 1/2017 | |
| WO | WO-2020257384 A1 \* | 12/2020 | ......... G07F 17/3225 |

\* cited by examiner

METHOD AND APPARATUS FOR PROCESSING ABUSING MESSAGE IN ANONYMOUS CHATROOM

CROSS-REFERENCE TO RELATED APPLICATION

This application claims the benefit of Korean Patent Application No. 10-2021-0194299 filed on Dec. 31, 2021, in the Korean Intellectual Property Office, the entire disclosure of which is incorporated herein by reference for all purposes.

BACKGROUND

1. Field of the Invention

One or more embodiments relate to a method and apparatus for processing an abusing message in an anonymous chatroom.

2. Description of the Related Art

Recently, there is an increase in the use of an anonymous chatroom which allows people to chat online with someone who is not even in a friend relationship. An anonymous chatroom, in which a chat message may be exchanged among users not in a friend relationship, is being widely used since the anonymous chatroom may be generated for various topics and be easily accessible.

However, since many and unspecified users who do not know each other may access the anonymous chatroom, there are often cases where some people join the anonymous chatroom to advertise or input a message including sexual expressions, swear words, and the like, during chatting. Therefore, a service agent operating the anonymous chatroom needs to prepare countermeasures against various abusing messages.

SUMMARY

Embodiments provide a rule set to an administrator terminal or allow a keyword for filtering an abusing message to be registered, thus providing a method and apparatus for effectively processing an abusing message displayed in an anonymous chatroom.

Embodiments propose a method and apparatus for providing convenient management of an abusing message by providing an option for an administrator terminal to process the abusing message in various manners through an interface.

According to an aspect, there is provided a method of processing an abusing message, performed by a message server, the method including: providing a rule set of a latest version to an administrator terminal of an anonymous chatroom, when the administrator terminal logs in to an account through a message application or enters the anonymous chatroom; receiving a new message in the anonymous chatroom; providing the new message to the administrator terminal of the anonymous chatroom; receiving a request for hiding the new message from the administrator terminal, when the new message is determined to be an abusing message based on at least one of a spam keyword and the rule set stored in the administrator terminal; and transmitting a command to hide the new message to a user terminal that joins the anonymous chatroom, according to the request for hiding the new message.

The rule set may be newly generated or updated according to a report of the administrator terminal or the user terminal that enters the anonymous chatroom.

When the new message is determined to be the abusing message, all contents included in the new message may be hidden, or some contents matching at least one of the rule set and the spam keyword, among all the contents included in the new message, may be hidden.

The administrator terminal may turn on or turn off a function that checks whether the new message is mapped to at least one of the rule set and the spam keyword, in order to determine whether the new message is the abusing message.

When the new message is determined to be the abusing message and thus is hidden, an account of an abusing terminal transmitting the new message may be forcibly removed from the anonymous chatroom or registered as an abuser.

According to another aspect, there is provided a method of processing an abusing message, performed by a message server, the method including: receiving a new message in an anonymous chatroom; providing the new message to an administrator terminal of the anonymous chatroom; receiving a request for hiding the new message from the administrator terminal, when the new message is determined to be an abusing message based on at least one of a spam keyword and a rule set stored in the administrator terminal; and transmitting a command to hide the new message to a user terminal that joins the anonymous chatroom, according to the request for hiding the new message. The rule set may be provided by an abusing server to the administrator terminal when the administrator terminal logs in to an account through a message application or enters the anonymous chatroom.

The rule set may be newly generated or updated according to a report of the administrator terminal or the user terminal that enters the anonymous chatroom.

When the new message is determined to be the abusing message, all contents included in the new message may be hidden, or some contents matching at least one of the rule set and the spam keyword, among all the contents included in the new message, may be hidden.

The administrator terminal may turn on or turn off a function that checks whether the new message is mapped to at least one of the rule set and the spam keyword, in order to determine whether the new message is the abusing message.

When the new message is determined to be the abusing message and thus is hidden, an account of an abusing terminal transmitting the new message may be forcibly removed from the anonymous chatroom or registered as an abuser.

According to another aspect, there is provided a method of processing an abusing message, performed by an abusing server, the method including: providing a rule set of a latest version to an administrator terminal of the anonymous chatroom, when the administrator terminal logs in to an account through a message application or enters the anonymous chatroom; receiving a request for hiding a new message from the administrator terminal, when the new message transmitted to the anonymous chatroom is determined to be an abusing message based on at least one of a spam keyword and a rule set stored in the administrator terminal; and transmitting a command to hide the new message to a user terminal that joins the anonymous chatroom, according to the request for hiding the new message.

The rule set may be newly generated or updated according to a report of the administrator terminal or the user terminal that enters the anonymous chatroom.

When the new message is determined to be the abusing message, all contents included in the new message may be hidden, or some contents matching at least one of the rule set and the spam keyword, among all the contents included in the new message, may be hidden.

The administrator terminal may turn on or turn off a function that checks whether the new message is mapped to at least one of the rule set and the spam keyword, in order to determine whether the new message is the abusing message.

When the new message is determined to be the abusing message and thus is hidden, an account of an abusing terminal transmitting the new message may be forcibly removed from the anonymous chatroom or registered as an abuser.

Additional aspects of embodiments will be set forth in part in the description which follows and, in part, will be apparent from the description, or may be learned by practice of the disclosure.

According to embodiments, a rule set may be provided to an administrator terminal in an anonymous chatroom or a keyword for filtering the abusing message may be registered, so that the abusing message displayed in the anonymous chatroom may be effectively hidden.

According to embodiments, options for an administrator terminal to process an abusing message through an interface may be provided in various manners in order to provide convenience for managing the abusing message.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, embodiments will be described in detail with reference to the accompanying drawings. The scope of the right, however, should not be construed as limited to the embodiments set forth herein. In the drawings, like reference numerals are used for like elements.

Various modifications may be made to the embodiment. Here, the embodiments are not construed as limited to the disclosure and should be understood to include all changes, equivalents, and replacements within the idea and the technical scope of the disclosure.

Although terms of "first" or "second" are used to explain various components, the components are not limited to the terms. These terms should be used only to distinguish one component from another component. For example, a first component may be referred to as a second component, and similarly the second component may also be referred to as the first component.

The terminology used herein is for the purpose of describing particular embodiments only and is not to be limiting of the embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like constituent elements and a repeated description related thereto will be omitted. In the description of embodiments, detailed description of well-known related structures or functions will be omitted when it is deemed that such description will cause ambiguous interpretation of the present disclosure.

Hereinafter, embodiments will be described in detail with reference to the accompanying drawings.

Figure 1:
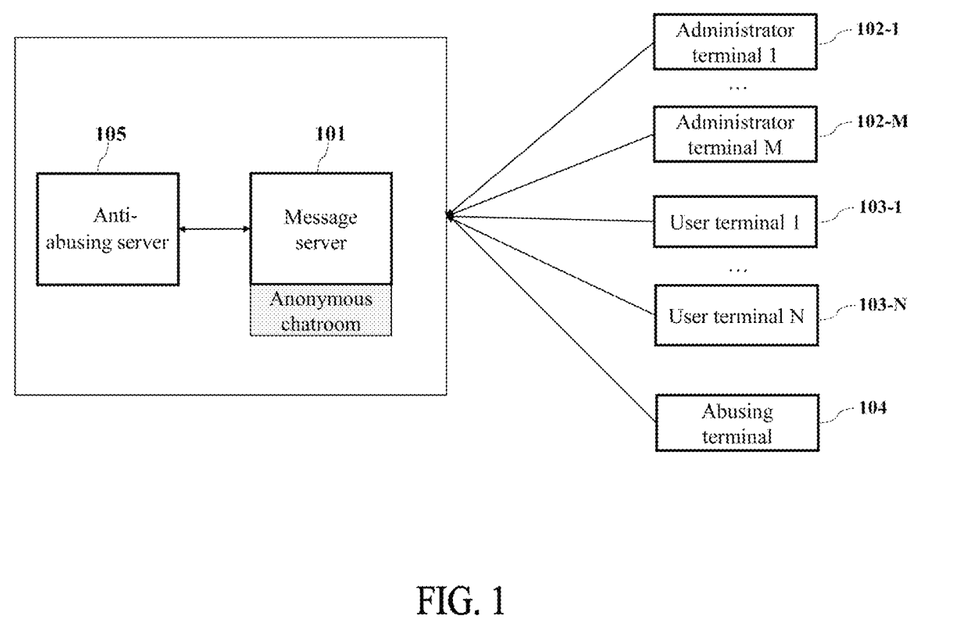
FIG. 1 is a diagram illustrating a method of processing an abusing message, according to an embodiment.

FIG. 1 is a diagram illustrating a method of processing an abusing message, according to an embodiment.

Referring to FIG. 1, an administrator terminal 102 may generate an anonymous chatroom through a message server 101. Similar to the chatroom of Kakao's Open Chat® (Open Chat is a unique trademark of Kakao) service, the anonymous chatroom may allow a user to set their unique profile or another profile generated for the anonymous chatroom and to exchange a message with those not in a friend relationship. The anonymous chatroom may be accessed through an external link and be used for many users to exchange opinions on various topics.

Referring to FIG. 1, M number of administrator terminals from a terminal administrator (administrator 1) 102-1 to a terminal administrator (terminal administrator M) 102-M may manage the anonymous chatroom. In this case, among the administrator terminals from the administrator terminal 102-1 to the administrator terminal 102-M, an administrator terminal corresponding to a host in the anonymous chatroom may generate the anonymous chatroom first, edit or delete the anonymous chatroom, or delegate the authority of managing the anonymous chatroom. Among the administrator terminal 102-1 to administrator terminals 102-M, an administrator terminal that has been entrusted the authority to manage the anonymous chatroom by the administrator terminal corresponding to the host may be an administrator terminal corresponding to a vice-host.

N number of user terminals 103-1 to 103-N may enter the anonymous chatroom by logging in to the anonymous chatroom with an account registered in a message application through the link of the anonymous chatroom. Herein, an abusing terminal 104 may refer to a terminal that transmits an abusing message, among the user terminals 103-1 to 103-N. In the anonymous chatroom, there may be one or more abusing terminals 104.

Hereinafter, the operation of one user terminal 103, which is any one of the N number of user terminals 103-1 to 103-N, is described. Similarly, one administrator terminal 102, which is any one of the M number of administrator terminals 102-1 to 102-M, is described.

Referring to FIG. 1, the message server 101 may manage the anonymous chatroom and process messages transmitted and received in the anonymous chatroom. According to an embodiment, when the administrator terminal 102 logs in with the account registered in the message application or enters the anonymous chatroom after logging in with the account of the message application, a rule set may be transmitted to the administrator terminal 102. In this case, the rule set may include rules updated to the latest version. In addition, when the user terminal 103 is changed to a host or a vice-host in the anonymous chatroom and thus becomes the administrator terminal 102, the rule set may be provided to the user terminal 103.

Figure 2:
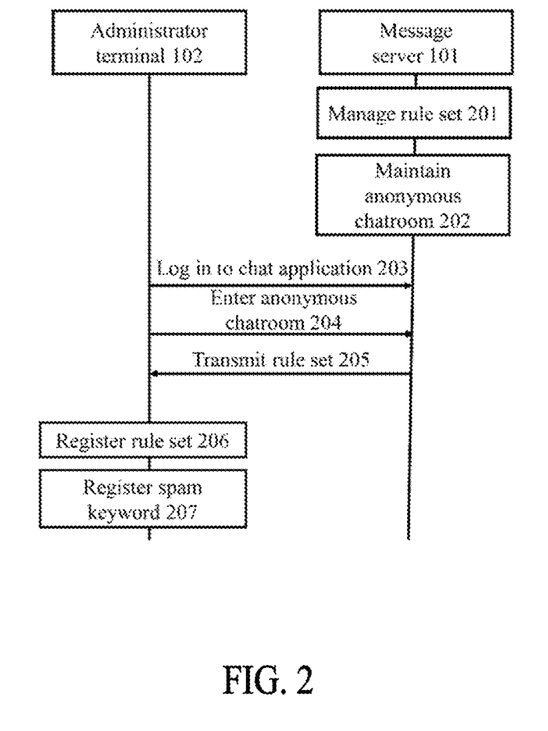
FIG. 2 is a diagram illustrating a process of providing a rule set through a message server, according to an embodiment.

According to an embodiment, as shown in FIG. 2, when the administrator terminal 102 logs in to the message application or enters the anonymous chatroom, the message server 101 may transmit the rule set to the administrator terminal 102. That is, the message server 101 may serve as an anti-abusing server 105.

Figure 3:
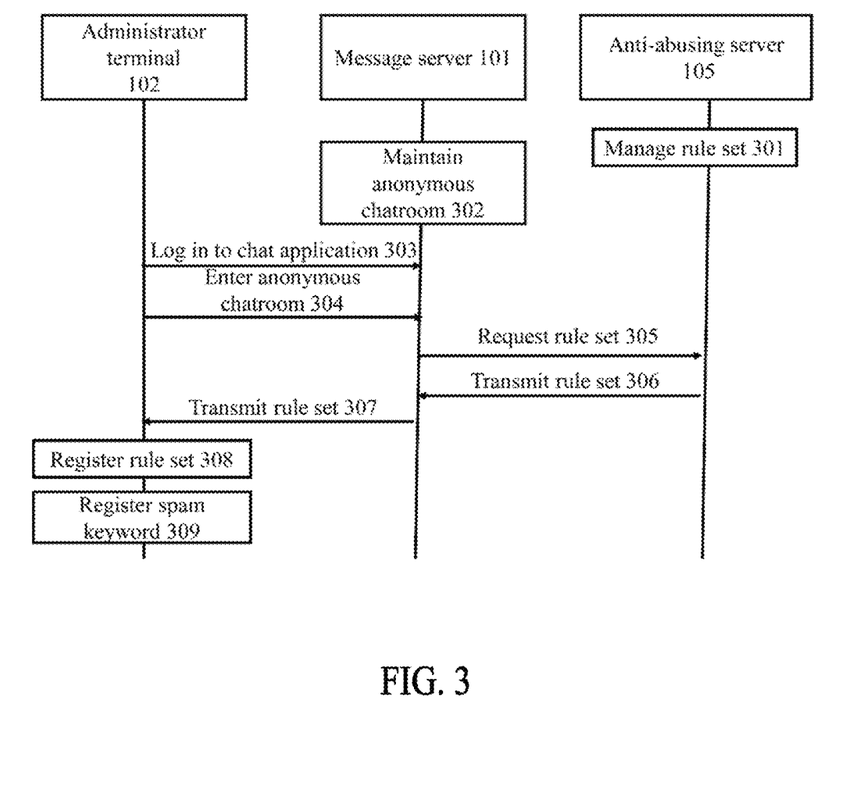
FIG. 3 is a diagram illustrating a process of providing a rule set through an anti-abusing server, according to an embodiment.

According to another embodiment, as shown in FIG. 3, when the administrator terminal 102 logs in to the message application or enters the anonymous chatroom, the anti-abusing server 105, which is distinguished from the message server 101, may transmit the rule set to the administrator terminal 102.

That is, according to the present disclosure, the message server 101 may function as the anti-abusing server 105 to provide the rule set to the administrator terminal 102, or the message server 101 may be separated from the anti-abusing server 105, so that the anti-abusing server 105 may provide the rule set to the administrator terminal 102.

According to an embodiment, the rule set that the message server 101 or the anti-abusing server 105 provides to the administrator terminal 102 may be used to determine whether a new message transmitted by the abusing terminal 104 is an abusing message. Separately, the administrator terminal 102 may directly register a spam keyword for determining whether a message is an abusing message.

For example, the rule set may be information including at least one of a URL, a keyword, a message identifier, a file identifier, a file tag, a message sender, and a file sender that require to be managed as spam. The rule set may be generated based on the report of the user terminal 103 or the administrator terminal 102, which is using the message service, or may be generated by the arbitrary designation of a system manager associated with the message server 101. In addition, the spam keyword registered by the administrator terminal 102 may be transmitted to the anti-abusing server 105 or the message server 101, in which case the rule set may be generated based on the spam keyword transmitted to the anti-abusing server 105 or the message server 101.

The rule set may be managed in N number by the message server 101 or the anti-abusing server 105. When the administrator terminal 102 activates the message application working with the message server 101 or logs in to the account registered in the messenger application, the administrator terminal 102 may receive the latest rule set from the message server 101 or the anti-abusing server 105, when the administrator terminal 102 enters the anonymous chatroom.

Then, the administrator terminal 102 may determine whether a new message transmitted by the abusing terminal 104 is an abusing message by using at least one of the rule set and the spam keyword. The new message may be a text, a file (e.g., a still image, a video, and the like), or a URL. When the new message transmitted by the abusing terminal 104 is determined to be an abusing message, the administrator terminal 102 may transmit, to the message server 101 or the anti-abusing server 105, a request for hiding the new message.

The message server 101 or the anti-abusing server 105 may transmit a command to hide the new message determined to be the abusing message to at least one of the administrator terminal 102 and the user terminal 103, which are clients. Then, the at least one of the administrator terminal 102 and the user terminal 103 may hide the new message determined to be the abusing message.

For example, the hiding of a message may refer to not displaying all contents included in the message or hiding specific contents (keywords or phrases) matching at least one of the rule set and the spam keyword, among all contents included in the message. Alternatively, the hiding of a message may include a case in which the message is displayed but overlapped by a certain object to prevent all the contents of the message from being identified. Also, the hiding of the message may include deleting the message itself. In this case, when the hiding of the message is performed by deleting the message, the administrator terminal 102 or the user terminal 103 may display an announcement that the message has been hidden as a display method, such as a rich feed.

In addition, the hiding of the message may include deleting a still image included in the message or transforming the still image so as not to be recognized (for example, mosaic processing). Alternatively, the hiding of the message may include deleting a video included in the message or preventing the video from being played.

FIG. 2 is a diagram illustrating a process of providing a rule set through a message server, according to an embodiment.

Referring to FIG. 2, in operation 201, a message server 101 may manage a rule set. The rule set may be information that the message server 101 provides to an administrator terminal 102, so that the administrator terminal 102 may determine whether a new message transmitted by an abusing terminal 104 to the message server 101 is an abusing message. The rule set may be updated periodically or randomly to maintain the latest version.

In operation 202, the message server 101 may maintain an anonymous chatroom created by the administrator terminal 102 serving as a host. The administrator terminal 102 may include a vice-host in the chatroom to whom a host in the chatroom delegates the authority of managing the anonymous chatroom, in addition to the host in the chatroom who generates the anonymous chatroom first.

When the anonymous chatroom is generated, a link may be generated, which is an access path for a plurality of user terminals 103-1 to 103-N not in a friend relationship to enter the anonymous chatroom. The link may be placed on a blog or a bulletin board and enable the user terminals 103-1 to 103-N not in a friend relationship with the administrator terminal 102, which is the host or the vice-host in the chatroom, to enter the chatroom.

In operation 203, the administrator terminal 102 may log in to an account registered in the message server 101 through a chat application.

In operation 204, the administrator terminal 102 may enter the anonymous chatroom. In operation 205, the message server 101 may provide a rule set to the administrator terminal 102. The rule set may be a rule set that is collectively applied to all anonymous chatrooms registered in the message server 101, a rule set that is managed in units of a property or a category of an anonymous chatroom, or a rule set that is managed in units of an anonymous chatroom. When the administrator terminal 102 logs in to the account registered in the message server 101 through the anonymous chat application as described in operation 203 or enters the anonymous chatroom as described in operation 204, the latest version of the rule set may be transmitted to the message server 101.

In operation 206, the administrator terminal 102 may locally register the rule set received from the message server 101 in a storage medium of the administrator terminal 102. In addition, in operation 207, the administrator terminal 102 may register a spam keyword for determining an abusing message independently from the process of registering the rule set.

FIG. 3 is a diagram illustrating a process of providing a rule set through an anti-abusing server, according to an embodiment.

In operation 301, an anti-abusing server 105 may manage a rule set. The rule set may be information that the anti-abusing server 105 provides to an administrator terminal 102, so that the administrator terminal 102 may determine whether a new message that an abusing terminal 104 transmits to a message server 101 is an abusing message. The rule set may be updated periodically or randomly to maintain the latest version.

In operation 302, the message server 101 may maintain an anonymous chatroom created by the administrator terminal 102 serving as a host. The administrator terminal 102 may include a vice-host in the chatroom to whom a host in the chatroom delegates the authority of managing the anonymous chatroom, in addition to the host in the chatroom who generates the anonymous chatroom first.

When the anonymous chatroom is generated, a link may be generated, which is an access path for a plurality of user terminals 103-1 to 103-N not in a friend relationship to enter the anonymous chatroom. The link may be placed on a blog or a bulletin board and enable the user terminals 103-1 to 103-N not in a friend relationship with the host or the vice-host in the chatroom to enter the chatroom.

In operation 303, the administrator terminal 102 may log in to an account registered in the message server 101 through a chat application.

In operation 304, the administrator terminal 102 may enter the anonymous chatroom.

When the administrator terminal 102 logs in to the account registered in the message server 101 through the anonymous chat application as described in operation 203 or enters the anonymous chatroom as described in operation 204, the message server 101 may request the abusing sever 105 that a rule set managed in units of an anonymous chatroom be transmitted to the administrator terminal 102.

In operation 305, the message server 101 may transmit the request for the rule set to the anti-abusing server 105. For example, the request for the rule set may include a message requesting that the message server 101 transfer the rule set to the anti-abusing server 105. Alternatively, the request for the rule set may include information about the fact that the administrator terminal 102 has logged in to the account registered in the message server 101 through the chat application or information about the fact that the administrator terminal 102 has entered the anonymous chatroom.

In operation 306, the anti-abusing server 105 may transmit the rule set to the message server 101. In operation 307, the message server 101 may transmit the rule set received from the anti-abusing server 105 to the administrator terminal 102. FIG. 3 illustrates that the anti-abusing server 105 transmits the rule set to the administrator terminal 102 through the message server 101. The present disclosure may also consider a process in which the anti-abusing server 105 directly transmits the rule set to the administrator terminal 102.

In operation 308, the administrator terminal 102 may locally register the rule set provided by the message server 101 in the storage medium of the administrator terminal 102. In addition, in operation 309, the administrator terminal 102 may register a spam keyword for determining an abusing message independently from the process of registering the rule set.

Figure 4:
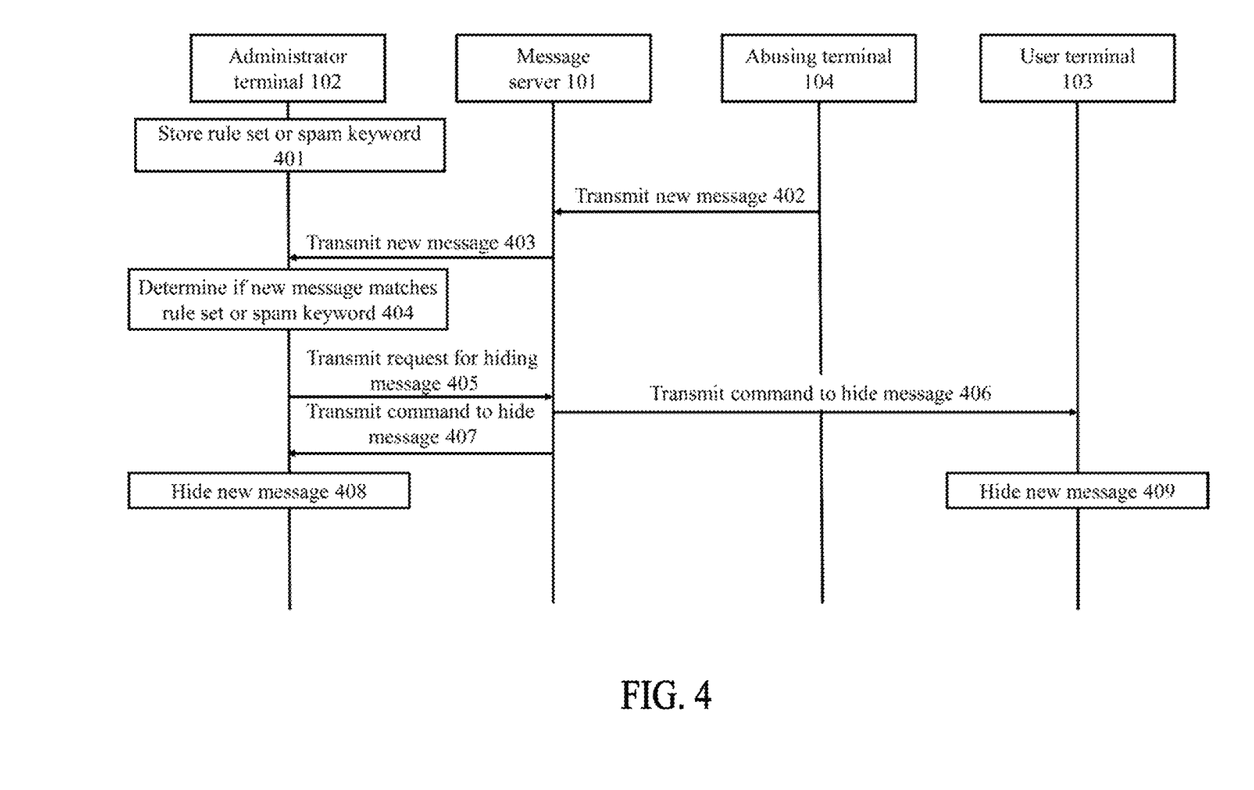
FIG. 4 is a diagram illustrating a process in which a message server transmits a command to hide a message, according to an embodiment.

FIG. 4 is a diagram illustrating a process in which a message server transmits a command to hide a message, according to an embodiment.

In FIG. 4, a message server 101 may function as an anti-abusing server 105, according to an embodiment. That is, the message server 101 shown in FIG. 4 may perform not only the function of transmitting and receiving a message but also the function of transmitting a command to hide an abusing message.

In operation 401, an administrator terminal 102 may store the rule set received from the message server 101 as shown in FIG. 2 or the rule set received from the anti-abusing server 105 as shown in FIG. 3.

In operation 402, an abusing terminal 104 may transmit a new message to the message server 101. Then, in operation 403, the message server 101 may transmit the new message transmitted by the abusing terminal 104 to the administrator terminal 102. Alternatively, the administrator terminal 102 may store a spam keyword for determining an abusing message.

In operation 404, the administrator terminal 102 may determine whether the new message matches the rule set or the spam keyword. When all or some of the new message matches the rule set or the spam keyword, the administrator terminal 102 may determine the new message transmitted by the abusing terminal 104 to be an abusing message.

In operation 405, the administrator terminal 102 may transmit, to the message server 101, a request for hiding the new message transmitted by the abusing terminal 104. In operations 406 and 407, the message server 101 may transmit a command to hide the new message delivered by the abusing terminal 104 to at least one of the administrator terminal 102 and the user terminal 103 that join the anonymous chatroom. In an example, the command to hide the new message may be a command for the administrator terminal 102 to hide the new message or to cancel the hiding of the new message. However, the command to hide the new message may be a command for the user terminal 103 to hide the new message but not cancel the hiding of the new message.

In operation 408, the administrator terminal 102 may hide the new message that the abusing terminal 104 transmits to the message server 101. Similarly, in operation 409, the user terminal 103 may hide the new message that the abusing terminal 104 transmits to the message server 101.

Although not shown in FIG. 4, when the new message transmitted by the abusing terminal 104 is hidden or the number of times that the new message is hidden exceeds a preset reference number, the message server 101 may forcibly remove the account of the abusing terminal 104 from the anonymous chatroom. The criteria for forcibly removing the account of the abusing terminal 104 may be set by a system manager related to the message server 101 or by the administrator terminal 102. In addition, when the new message transmitted by the abusing terminal 104 is hidden or the number of times the new message is hidden exceeds a predetermined reference number, the account of the abusing terminal 104 may be registered as an abuser.

Figure 5:
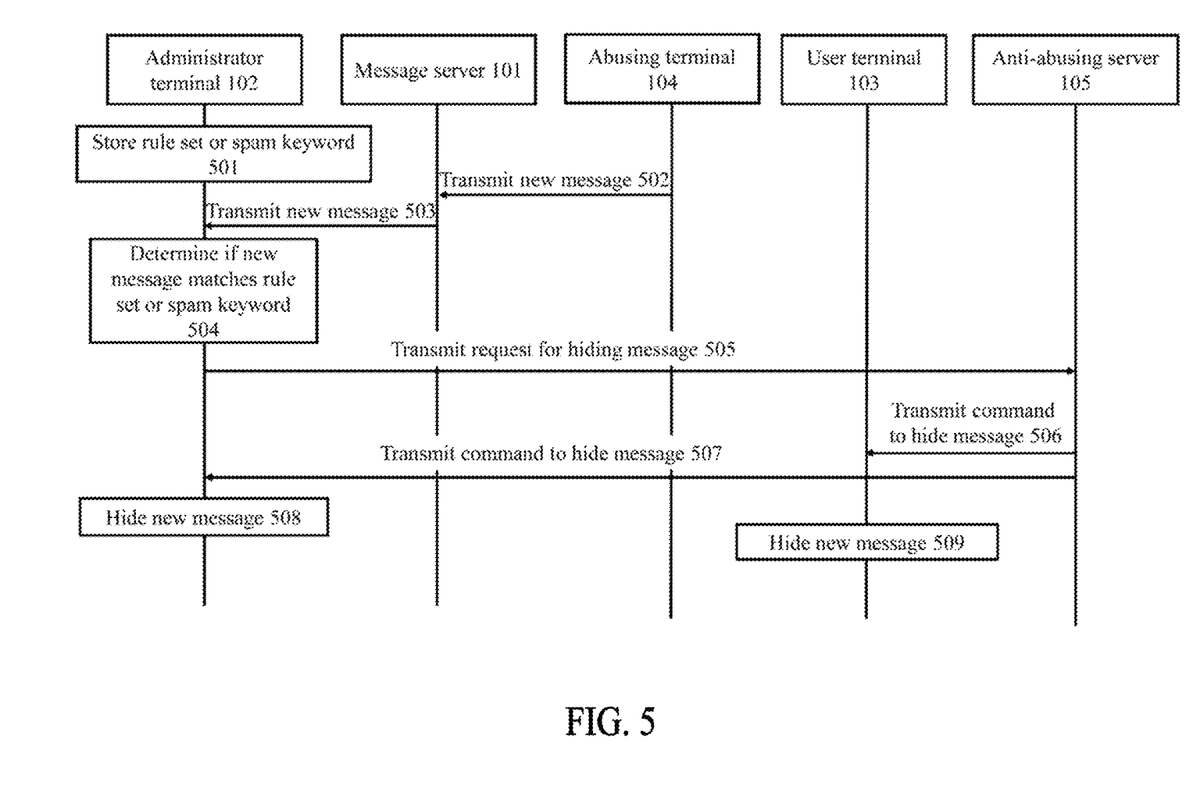
FIG. 5 is a diagram illustrating a process in which an anti-abusing server transmits a command to hide a message, according to an embodiment.

FIG. 5 is a diagram illustrating a process, in which an anti-abusing server transmits a command to hide a message, according to an embodiment.

FIG. 5 illustrates a case in which the role of a message server 101 is separated from the role of an abusing server 105, according an embodiment. When the new message transmitted by an abusing terminal 104 is determined to be an abusing message, the process of the anti-abusing server 105 directly transmitting a command to hide a new message to at least one of an administrator terminal 102 and a user terminal 103 is illustrated in FIG. 5.

In operation 501, the administrator terminal 102 may store the rule set received from the message server 101 as described with reference to FIG. 2 or the rule set received from the anti-abusing server 105 as described with reference to FIG. 3. Alternatively, the administrator terminal 102 may store a spam keyword for determining an abusing message.

In operation 502, the abusing terminal 104 may transmit a new message to the message server 101. Then, in operation 503, the message server 101 may transmit the new message transmitted by the abusing terminal 104 to the administrator terminal 102.

In operation 504, the administrator terminal 102 may determine whether the new message matches the rule set or the spam keyword. When all or some of the new message matches the rule set or the spam keyword, the administrator terminal 102 may determine the new message transmitted by the abusing terminal 104 to be an abusing message.

In operation 505, the administrator terminal 102 may directly transmit, to the anti-abusing server 105, a request for hiding the new message transmitted by the abusing terminal 104. In another example, unlike operation 505, the administrator terminal 102 may transmit a request for hiding the new message to the anti-abusing server 105 through the message server 101.

In operations 506 and 507, the anti-abusing server 105 may transmit a command to hide the new message transmitted by the abusing terminal 104 to at least one of the administrator terminal 102 and the user terminal 103 that join the anonymous chatroom. In an example, the command to hide the new message may be a command for the administrator terminal 102 to hide the new message or cancel the hiding of the new message. However, the command to hide the new message may be a command for the user terminal 103 to hide the new message but not cancel the hiding of the new message.

In operation 508, the administrator terminal 102 may hide the new message transmitted by the abusing terminal 104 to the message server 101. Similarly, in operation 509, the user terminal 103 may hide the new message that the abusing terminal 104 transmits to the message server 101.

Although not shown in FIG. 5, when the new message transmitted by the abusing terminal 104 is hidden or the number of times that the new message is hidden exceeds a preset reference number, the message server 101 may forcibly remove the account of the abusing terminal 104 from the anonymous chatroom. The criteria for forcibly removing the account of the abusing terminal 104 may be set by a system manager related to the message server 101 or by the administrator terminal 102. In addition, when the new message transmitted by the abusing terminal 104 is hidden or the number of times the new message is hidden exceeds a predetermined reference number, the account of the abusing terminal 104 may be registered as an abuser.

FIG. 5 illustrates a process in which the anti-abusing server 105 directly transfers the rule set to the administrator terminal 102, but the present disclosure may include a process in which the anti-abusing server 105 transmits the rule set to the administrator terminal 102 through the message server 101.

Figure 6:
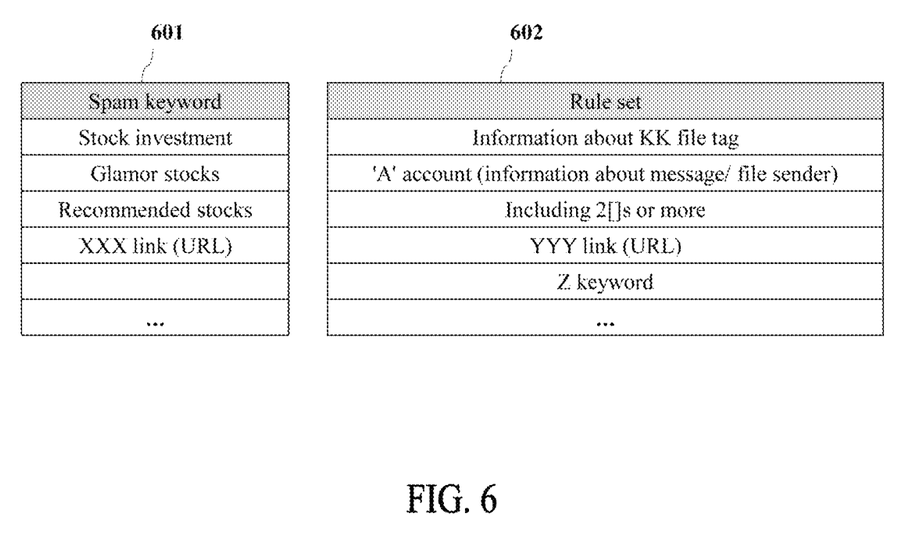
FIG. 6 is a diagram illustrating an example of a rule set and a spam keyword, according to an embodiment.

FIG. 6 is a diagram illustrating an example of a rule set and a spam keyword, according to an embodiment.

Referring to FIG. 6, an example of a spam keyword 601 and a rule set 602 is shown. The spam keyword 601 may refer to a keyword input by an administrator terminal 102 of an anonymous chatroom, so that the administrator terminal 102 may determine whether a new message transmitted to the anonymous chatroom is an abusing message.

The spam keyword 601 shown in FIG. 6 may include a keyword and a URL registered by the administrator terminal 102. The spam keyword 601 may be applied to all anonymous chatrooms in which the administrator terminal 102 is registered as an administrator or applied to some anonymous chatrooms designated by the administrator terminal 102. The spam keyword 601 registered by the administrator terminal 102 may be transmitted to the anti-abusing server 105. Then, the anti-abusing server 105 may generate the rule set 602 based on the spam keyword 601.

In addition, the rule set 602 of the latest version may be provided to the administrator terminal 102 when the administrator terminal 102 logs in to an account registered in the message server 101 through a chat application or enters an anonymous chatroom. The rule set 602 may be provided by the message server 101 as described with reference to FIG. 2 or by the anti-abusing server 105 as described with reference to FIG. 3. The rule set 602 may refer to information including at least one of a URL, a keyword, a message identifier, a file identifier, a file tag, a message sender, and a file sender that require to be managed as spam. In addition, the rule set 602 may include an identifier or tag information of media content, such as images, videos, symbols, and emoticons.

When a new message transferred to the anonymous chatroom matches a specific rule defined in the rule set 602, the new message may be determined to be an abusing message. The rule set 602 may be generated by the report of the administrator terminal 102 or the user terminal 103 that is using the message service, or by arbitrary designation of a system manager related to the message server 101. The rule set 602 may be managed in N number of anonymous chatrooms. The rule set 602 may be newly created each time or updated.

In addition, when the user terminal 103 that has entered the anonymous chatroom changes to a host or a vice-host in the anonymous chatroom and thus becomes the administrator terminal 102, the message server 101 or the anti-abusing server 105 may transmit the rule set 602 of the latest version to the user terminal 103 which changes to the administrator terminal 102.

The rule set 602 may be managed in the message server 101 differently according to the subject or category of an anonymous chatroom. Since the user terminal 103 that is not in a friend relationship and in a non-acquaintance relationship with many of the participants may join the anonymous chatroom according to a specific topic, a rule set may be also provided differently, according to the subject or category, from the rule set by the administrator terminal 102 when the anonymous chatroom is generated.

Alternatively, the rule set 602 may be divided into a basic rule and a feature rule for management. The basic rule may be commonly applicable regardless of the subject or category of the anonymous chatroom, such as profanity, sexual expression, advertisement, and the like, and the feature rule may include a rule related to the subject or category of the anonymous chatroom.

In another example, when the abusing terminal 104 joining an anonymous chatroom transmits a new message to the message server 101, the message server 101 may transmit the new message to the administrator terminal 102 corresponding to the host or the vice-host in the anonymous chatroom. Then, the administrator terminal 102 may determine whether the new message transmitted by the abusing terminal 104 is an abusing message, based on the rule set 602 provided by the message server 101 or the anti-abusing server 105 or the spam keyword directly registered by the administrator terminal 102.

When the new message is determined to be an abusing message, the administrator terminal 102 may transmit a request for hiding the new message to the message server 101 as shown in FIG. 4. Alternatively, when the new message is determined to be an abusing message, the administrator terminal 102 may transmit a request for hiding the new message to the anti-abusing server 105 as shown in FIGS. 5 and 6.

For example, the administrator terminal 102 may transmit the log ID of the new message or the log ID of a media file, which is a target of the request for hiding, to the message server 101 or the anti-abusing server 105.

When the new message transmitted by the abusing terminal 104 is determined to be an abusing message according to the spam keyword 601 or the rule set 602 shown in FIG. 6, the new message may be hidden.

For example, the hiding of the message may refer to not displaying all contents included in the message or hiding specific contents (keywords or phrases) matching at least one of the rule set and the spam keyword, among all contents included in the message. Alternatively, the hiding of the message may include a case in which the message is displayed but overlapped by a certain object, so that the administrator terminal 102 or the user terminal 103 may not identify all the contents of the message. In addition, the hiding of the message may include deleting a still image included in the message or transforming the still image so as not to be recognized (for example, mosaic processing). Alternatively, the hiding of the message may include deleting a video included in the message or preventing the video from being played.

The message server 101 may forcibly remove, from the chatroom, the account of the abusing terminal 104 that transmits, once or a predetermined number or more, the new message matching at least one of the spam keyword 601 and the rule set 602 and thus determined to be an abusing message.

For example, in order to forcibly remove the account of the abusing terminal 104, the message server 101 may determine the forcible removal by itself or need a request for the removal from the administrator terminal 102 or the request for the removal from a certain number of the user terminals 103. In addition, when the new message transmitted by the abusing terminal 104 is hidden or the number of times the new message is hidden exceeds a predetermined reference number, the account of the abusing terminal 104 may be registered as an abuser.

Alternatively, with respect to the abusing terminal 104 transmitting the new message matching at least one of the spam keyword 601 and the rule set 602 and thus determined to be the abusing message, the message server 101 may display the ID of the abusing terminal 104 and the number of abusing messages transmitted by the abusing terminal 104, in a specific area of the chatroom (e.g., an area for notices, such as the top area of the anonymous chatroom, and the profile area of the account corresponding to the abusing terminal), so that the user terminal 103 joining the anonymous chatroom may identify the ID of the abusing terminal 104 and the number of abusing messaged transmitted by the abusing terminal 104.

The administrator terminal 102 may manage the list of abusing terminals 104 transmitting the abusing message. In addition, the administrator terminal 102 may forcibly remove the account of the abusing terminal 104 from the anonymous chatroom or cancel the forcible removal. In addition, the administrator terminal 102 may cancel the hiding of the new message determined to be the abusing message and thus hidden.

The method according to embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductive wire memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific embodiments in order to aid in understanding of the present disclosure, but are not intended to limit the scope of the present disclosure. It will be apparent to those skilled in the art that various modifications based on the technical spirit of the present disclosure, as well as the disclosed embodiments, can be made.

What is claimed is:

1. A method of processing an abusing message, performed by a message server, the method comprising:
   providing a rule set of a latest version to an administrator terminal of an anonymous chatroom, in response to an account of the administrator terminal logging into a messaging service or entering the anonymous chatroom of the messaging service;
   receiving a new message through the anonymous chatroom;
   providing the new message to the administrator terminal of the anonymous chatroom;
   receiving a request signal for hiding the new message from the administrator terminal, the request signal indicating that the new message is an abusing message based on the rule set stored in the administrator terminal; and
   transmitting a command to hide the new message to a user terminal that joins the anonymous chatroom, according to the request signal for hiding the new message.

2. The method of claim 1, wherein the rule set is newly generated or updated according to a report of the administrator terminal or the user terminal that enters the anonymous chatroom.

3. The method of claim 1, wherein, when the new message is determined to be the abusing message,
   all contents comprised in the new message are hidden, or some contents matching at least one of the rule set and a spam keyword, among all the contents comprised in the new message, are hidden.

4. The method of claim 1, wherein the request signal includes information from the administrator terminal on whether the new message is mapped to at least one of the rule set and a spam keyword.

5. The method of claim 1, wherein, when the new message is determined to be the abusing message and thus is hidden, an account of an abusing terminal transmitting the new message is forcibly removed from the anonymous chatroom or registered as an abuser.

6. A method of processing an abusing message, performed by a message server, the method comprising:
   receiving a new message through an anonymous chatroom;
   providing the new message to an administrator terminal of the anonymous chatroom;
   receiving a request signal for hiding the new message from the administrator terminal, the request signal indicating that the new message is an abusing message based on a rule set stored in the administrator terminal; and
   transmitting a command to hide the new message to a user terminal that joins the anonymous chatroom, according to the request signal for hiding the new message,
   wherein, the rule set is provided by an abusing server to the administrator terminal in response to an account of the administrator terminal logging in to a messaging service or entering the anonymous chatroom of the messaging service.

7. The method of claim 6, wherein the rule set is newly generated or updated according to a report of the administrator terminal or the user terminal that enters the anonymous chatroom.

8. The method of claim 6, wherein, when the new message is determined to be the abusing message,
   all contents comprised in the new message are hidden, or some contents matching at least one of the rule set and a spam keyword, among all the contents comprised in the new message, are hidden.

9. The method of claim 6, wherein the request signal includes
   information from the administrator terminal on whether the new message is mapped to at least one of the rule set and a spam keyword.

10. The method of claim 6, wherein, when the new message is determined to be the abusing message and thus is hidden, an account of an abusing terminal transmitting the new message is forcibly removed from the anonymous chatroom or registered as an abuser.

11. A method of processing an abusing message, performed by an abusing server, the method comprising:
   providing a rule set of a latest version to an administrator terminal of the anonymous chatroom, in response to an account of the administrator terminal logging in to a messaging service or entering the anonymous chatroom of the messaging service;
   receiving a request signal for hiding a new message from the administrator terminal, the request signal indicating that the new message is an abusing message based on the rule set stored in the administrator terminal; and transmitting a command to hide the new message to a user terminal that joins the anonymous chatroom, according to the request signal for hiding the new message.

12. The method of claim 11, wherein the rule set is newly generated or updated according to a report of the administrator terminal or the user terminal that enters the anonymous chatroom.

13. The method of claim 11, wherein, when the new message is determined to be the abusing message,
all contents comprised in the new message are hidden, or some contents matching at least one of the rule set and a spam keyword, among all the contents comprised in the new message, are hidden.

14. The method of claim 11, wherein the request signal includes information from the administrator terminal on whether the new message is mapped to at least one of the rule set and a spam keyword.

15. The method of claim 11, wherein, when the new message is determined to be the abusing message and thus is hidden, an account of an abusing terminal transmitting the new message is forcibly removed from the anonymous chatroom or registered as an abuser.

16. A server device comprising:
at least one processor; and
a memory storing instructions, wherein the instructions, when executed by the at least one processor, cause the server device to:
providing a rule set of a latest version to an administrator terminal of a chatroom, in response to an account of the administrator terminal logging into a messaging service or entering the chatroom of the messaging service;
receiving a new message through the chatroom;
providing the new message to the administrator terminal of the chatroom;
receiving a request signal for hiding the new message from the administrator terminal, the request signal indicating that the new message is an abusing message based on the rule set stored in the administrator terminal; and
transmitting a command to hide the new message to a user terminal that joins the chatroom, according to the request signal for hiding the new message.

17. The server device of claim 16, wherein the chatroom includes an anonymous chatroom of the messaging service.

18. The server device of claim 16, wherein the rule set is newly generated or updated according to a report of the administrator terminal or the user terminal that enters the chatroom.

19. The server device of claim 16, wherein, when the new message is determined to be the abusing message, all contents comprised in the new message are hidden, or some contents matching at least one of the rule set and a spam keyword, among all the contents comprised in the new message, are hidden.

20. The server device of claim 16, wherein the request signal includes information from the administrator terminal on whether the new message is mapped to at least one of the rule set and a spam keyword.

* * * * *